US005511531A

United States Patent [19]

Cook et al.

[11] Patent Number: 5,511,531

[45] Date of Patent: Apr. 30, 1996

[54] EGR VALVE WITH FORCE BALANCED PINTLE

[75] Inventors: John E. Cook; William C. Gillier, both of Chatham, Canada

[73] Assignee: Siemens Electric Ltd., Chatham, Canada

[21] Appl. No.: 245,944

[22] Filed: May 19, 1994

[51] Int. Cl.[6] .......................... F02M 25/07; F16K 31/126

[52] U.S. Cl. .............................................................. 123/568

[58] Field of Search ..................................... 123/568, 571

[56] References Cited

U.S. PATENT DOCUMENTS

| | | | |
|---|---|---|---|
| 3,774,583 | 11/1973 | King | 123/568 |
| 4,106,449 | 8/1978 | Matsumato et al. | 123/568 |
| 4,120,480 | 10/1978 | Ando et al. | 123/568 |
| 4,122,810 | 10/1978 | Berriman | 123/568 |
| 4,805,582 | 2/1989 | Braun et al. | 123/568 |
| 5,027,781 | 7/1991 | Lewis | 123/568 |
| 5,035,228 | 7/1991 | Bender | 123/568 |
| 5,052,363 | 10/1991 | Stiles | 123/568 |
| 5,351,669 | 10/1994 | Herzog | 123/568 |

FOREIGN PATENT DOCUMENTS

| | | | |
|---|---|---|---|
| 2448151 | 4/1975 | Germany | 123/568 |
| 2-95763 | 4/1990 | Japan | 123/568 |
| 4-109069 | 4/1992 | Japan | 123/568 |
| 4-254083 | 9/1992 | Japan | 123/568 |
| 6-50217 | 2/1994 | Japan | 123/568 |

*Primary Examiner*—David A. Okonsky

[57] ABSTRACT

An electrically operated EGR valve has a pintle for opening and closing the valve. The pintle is actuated by an linear actuator to open and close two ports which are connected to the outlet of the valve. The pintle has a frustoconical surface which mates with the two ports. The input passageway to the EGR valve is in fluid communication with both sides of the pintle which are the sides taken in direction of the movement of the linear actuator. The pintle being pressure-balanced when the electrically operated linear actuator attempts to move the pintle to either further open or further close the ports, the pintle is more responsive without increasing the size of the actuator.

11 Claims, 2 Drawing Sheets

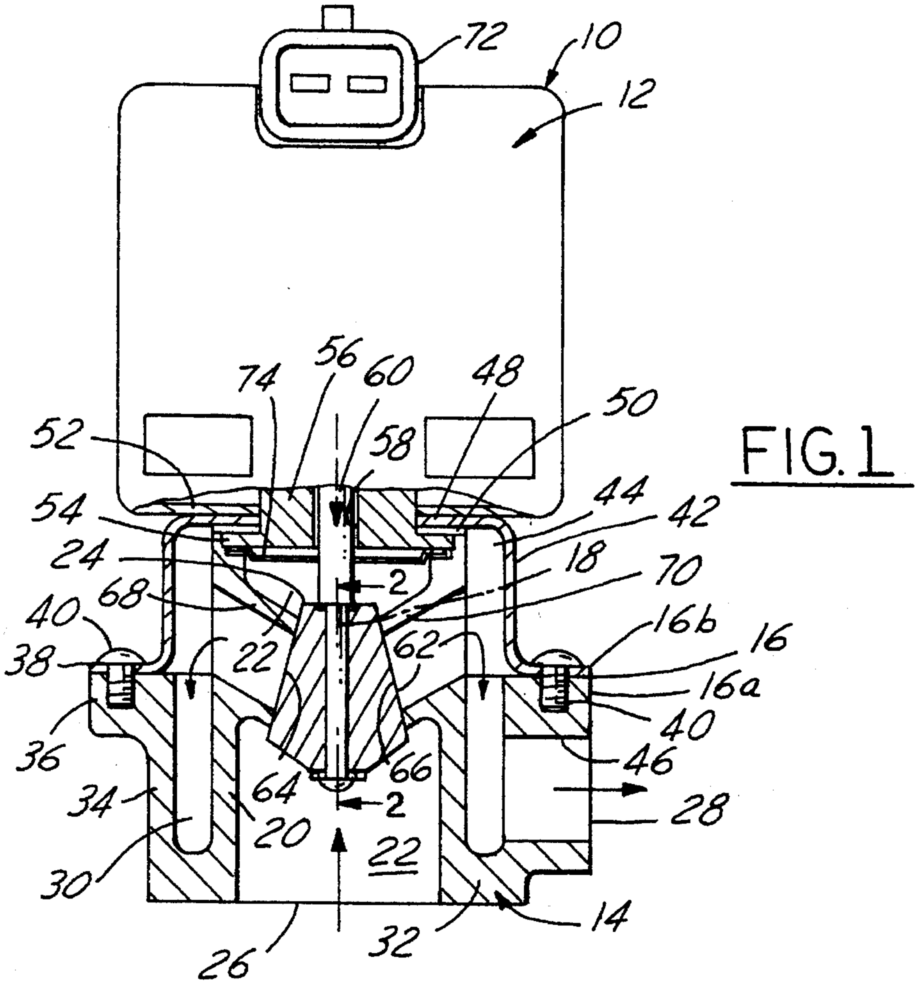
FIG. 1
FIG. 2
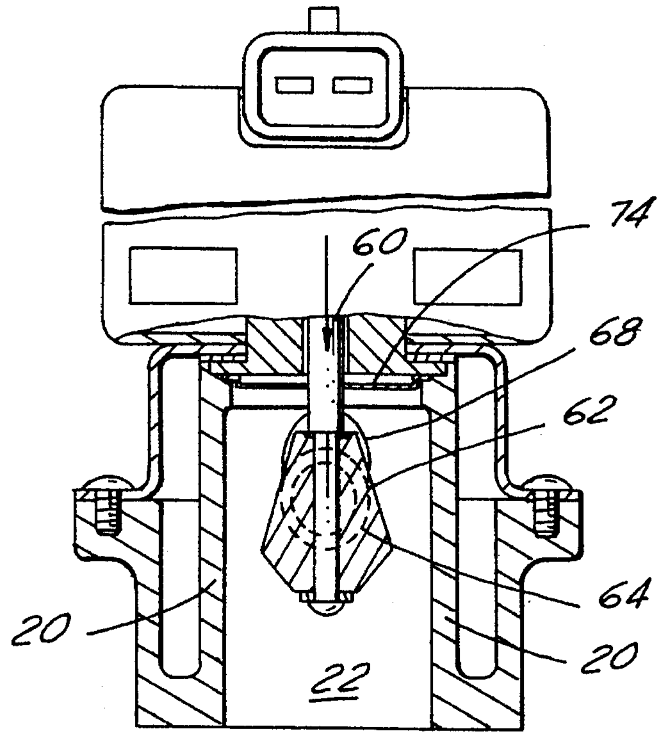

EGR VALVE WITH FORCE BALANCED PINTLE

FIELD OF THE INVENTION

This invention relates to an exhaust gas recirculation (EGR) system for an internal combustion engine in which a portion of the engine exhaust gas is recirculated through an EGR valve to dope a fresh air-fuel charge for the engine with some of the engine's exhaust gas.

BACKGROUND AND SUMMARY OF THE INVENTION

Typical EGR valves use a simple unbalanced pintle or poppet that is selectively positioned by an actuator relative to a valve seat that circumscribes a passage through the valve housing. Typical actuators are either pneumatic (vacuum) or electric. The actuator receives a control signal, either vacuum, or electric, as the case may be, from a control source and positions the pintle or poppet correspondingly. Sometimes an electric vacuum regulator is used to convert an electrical control signal into a corresponding vacuum control signal for the actuator.

Increasingly stringent demands on the performance of EGR valves in internal combustion engines of automotive vehicles require improved control of the EGR valve, especially during transient operating conditions where engine load and speed change relatively quickly. In order to meet more stringent demands, an electric actuator appears to be a preferred operator for an EGR valve.

An electric actuator, such as a solenoid, can deliver sufficiently fast response, but typically with only comparatively small force over comparatively small travel distances unless the solenoid's size is significantly increased. In this usage, space is usually at a premium, and cost is always a major consideration.

In order to provide an improved EGR valve that can meet more stringent demands through the use of an electric actuator, such as a solenoid, without significantly enlargement of a solenoid actuator, the present invention proposes that the valve be pressure-balanced at least to some significant degree. It is therefore toward a new and improved EGR valve that comprises both an electric actuator and a pressure-balanced valve that the present invention is directed.

Generally speaking, the present invention relates in one aspect to an EGR valve having a pintle that is disposed within an internal passage of the valve housing. This passage extends internally of the housing from an exhaust inlet of the housing to an exhaust outlet of the housing. The pintle is selectively linearly positionable within the housing by means of a linear electric actuator that positions the pintle linearly in correspondence with an electric control signal applied to the actuator. The pintle has opposite axial ends from one of which a shaft extends to operative connection with the electric actuator. The other of these axial ends of the pintle is in communication with the exhaust inlet via the internal passage, and the housing is further constructed to comprises means to communicate the exhaust inlet to the other axial end of the pintle to provide at least some pressure-balancing of the pintle. The housing still further comprises internal valve seat means disposed within the passage at a location that is axially intermediate the opposite axial ends of the pintle for coaction with an axially intermediate portion of the pintle that lies between the pintle's opposite axial ends. The selective positioning of the pintle by the actuator selectively relatively positions the axially intermediate portion of the pintle in relation to the valve seat means for selectively restricting the flow of recirculated exhaust gas through the valve seat means to the exhaust outlet.

In a disclosed embodiment, the axially intermediate portion of the pintle comprises a frustoconically shaped outer surface that is co-axial with the direction of linear actuation of the pintle. The housing comprises a generally cylindrical side wall that bounds the side of a central cylindrical internal space within which the pintle is co-axially disposed; this space is open at one axial end to form the exhaust inlet, and the space itself forms an initial portion of the internal housing passage extending from the exhaust inlet. The space also serves to communicate the opposite axial ends of the pintle to the exhaust inlet for providing at least some degree of pressure-balancing of the pintle. The seat means are provided at the inner distal ends of short tubular stub pipes that are formed integrally with, and extend through, the aforementioned cylindrical wall that bounds the central internal space within which the pintle is disposed. The tubular stub pipes extend radially inwardly from the aforementioned cylindrical housing wall, and in the disclosed embodiment there are two stub pipes diametrically opposite each other. The radially inner distal ends of the tubular stub pipes lie on an imaginary frustoconical surface that is essentially coaxial with the pintle and that is also essentially congruent with the frustoconical outer surface of the pintle when the pintle is seated on said seat means to close the internal passage through the housing to flow. Accordingly, the inner distal ends of the tubular stub pipes have compound curvatures for mating with similarly congruent zones diametrically opposite each other on the outer frustoconical surface of the pintle when the pintle is closed against them in its retracted position. When the pintle is extended away from its retracted position, its frustoconical outer surface unseats from the inner ends of these tubular stub pipes allowing the exhaust to enter the stub pipes and pass through the aforementioned cylindrical wall and ultimately to the exhaust outlet.

Advantageously, the pintle can be fabricated from a material such as stainless steel while the housing can be fabricated from material like aluminum. The distal ends of the tubular stub pipes are advantageously ceramic-coated to provide ceramic coated seating surfaces against which the pintle makes closing contact.

The foregoing, along with further features, advantages, and benefits of the invention, will be seen in the ensuing description and claims which are accompanied by a drawing. The drawing discloses a presently preferred embodiment according to the best mode contemplated at this time for carrying out the invention.

BRIEF DESCRIPTION OF THE DRAWING

FIG. 1 is a longitudinal view of an EGR valve, including linear electric actuator, embodying principles of the invention, with the valve portion being shown in cross section.

FIG. 2 is a cross-sectional view at 90 degrees to the view of FIG. 1 as taken in the direction of arrows 2—2 in FIG. 1.

DESCRIPTION OF THE PREFERRED EMBODIMENT

Figure 3:
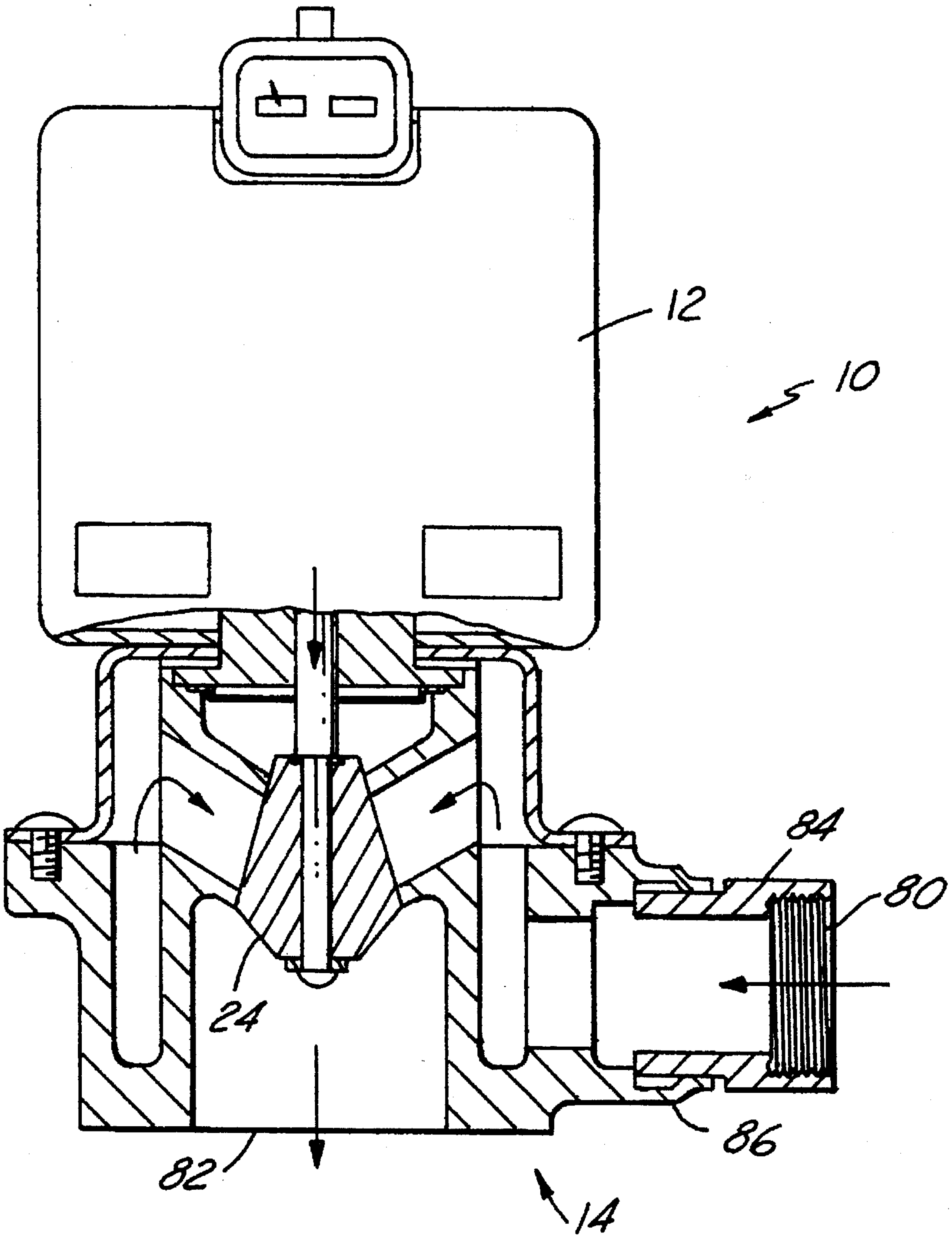
FIG. 3 is a view similar to FIG. 1, showing a modified form.

The drawings show an exemplary EGR valve 10 comprising a linear electric actuator 12 and a valve mechanism 14. Valve mechanism 14 comprises a housing 16 consisting of several parts assembled together, including a main housing part 16a and a cover 16b. EGR valve 10 comprises a main longitudinal axis 18, and both actuator 12 and housing 16 are co-axial with axis 18. Main housing part 16a comprises a cylindrical side wall 20 that is co-axial with axis 18 and bounds a generally cylindrical interior space 22.

Valve mechanism 14 further comprises a pintle 24 that is disposed within space 22 co-axial with axis 18. Space 22 is open at the bottom of housing part 16a thereby forming an exhaust gas inlet 26 for housing 16. The continuation of space 22 upward from inlet 26 forms an initial portion of a passage for flow through housing 16 to an exhaust gas outlet 28 that is at the side of housing part 16a.

Housing part 16a is formed with an upwardly open annular well 30 around the outside of the lower portion of wall 20, the well being defined by a radially outer surface portion of wall 20, by an upper surface portion of a bottom wall 32 of housing part 16a, and by a radially inner surface portion of an outer wall 34 of housing part 16a spaced radially outwardly from wall 20. The upper rim of wall 34 comprises a flange 36. Cover 16b fits cooperatively onto and over the upper end of housing part 16a and comprises a flange 38 that is fastened in a sealed manner to flange 36 by fasteners 40. Cover 16b further comprises a cylindrical side wall 42 spaced radially outwardly of the upper portion of wall 20 so that the two cooperatively define a downwardly open annular space 44 that forms an upward extension of well 30. With this arrangement, space 44 and well 30 cooperatively form an annular space that is closed at opposite axial ends but at well 30 is communicated to exhaust outlet 28 via a radial hole 46. At its top cover 16b comprises an inwardly directed flange 48 that, along with an underlying gasket 50, are sandwiched in a sealed manner between respective sandwiching portions 52, 54 of actuator 12.

The sandwiching portion 54 is a circular radially outwardly directed flange at the lower end of a part 56 of actuator 12. Part 56 comprises a central hole 58 through which a shaft 60 passes from pintle 24 into the interior of actuator 12. Pintle 24 is affixed in a secure manner to the protruding end portion of shaft 60, such as in the manner shown.

The drawings show pintle 24 in a position closing the passage between inlet 26 and outlet 28. The closure occurs because pintle 24 has an outer frustoconical surface 62 that is co-axial with axis 18 and that is seated on respective seating surfaces 64, 66 that are diametrically opposite each other at the radially inner distal ends of respective tubular stub pipes 68 and 70 that extend a short distance radially inwardly from wall 20 at a non-perpendicular angle to axis 18. Stub pipes 68 and 70 are integrally formed with wall 20 and extend through the wall to space 44. Seats 64 and 66 lie on an imaginary frustoconical surface that is essentially co-axial with surface 62 of pintle 24 and that is also essentially congruent with surface 62 when pintle 24 is seated against seats 64 and 66, as shown, to close the inner ends of stub pipes 68 and 70 and hence close the passage through the valve between inlet 26 and outlet 28.

The drawing figures show shaft 60 and pintle 24 in retracted position closing EGR valve 10. When actuator 12 is operated by an electrical signal applied to the actuator via an electrical connector 72, shaft 60, and hence pintle 24, are extended from the retracted position a distance corresponding to the electrical signal. Such extension of the pintle unseats surface 62 from seats 64 and 66 thereby allowing exhaust to flow from inlet 26, through space 22, through stub pipes 68 and 70, through space 44, through well 30, and through hole 46 to exit EGR valve 10 at exhaust outlet 28. The extent to which pintle is extended by shaft 60 from actuator 12 determines the extent to which it restricts the exhaust flow through housing 16, and therefore the pintle is selectively positionable in accordance with the signal supplied to actuator 12 to thereby selectively control the restriction that the valve presents to the exhaust flow. In this way EGR valve 10 controls the amount of exhaust gas that is allowed to dope a fresh air-fuel charge to the engine.

An annular scraper element 74 is provided between pintle 24 and part 56 for the purpose of scraping off any residue that may accumulate on shaft 60 so that such residue is prevented from passing into actuator 12. At its center scraper element 74 has a circular hole with which shaft 60 has a close sliding fit. The radially outer margin of element 74 is captured such that it is constrained against any significant axial motion, but it is allowed some radial float so that it will follow any radial float in shaft 60 during operation of valve.

Advantageously, main housing part 16a may be fabricated from aluminum and pintle 24 from stainless steel. The seats 64 and 66 are preferably ceramic coated to provide effective sealing of the stainless steel pintle to the ends of the stub pipes when the pintle is seated on them.

Since stub pipes 68 and 70 each has a limited circumferential extent, it can be seen that space 22 is present at both opposite axial ends of pintle 24 thereby providing a certain amount of pressure-balancing when the valve is closed and an even greater amount of pressure-balancing is when the valve is open. This pressure-balancing enables positioning of the pintle to be accomplished with a lower force actuator when the valve is to be operated from closed to open against the pressure of the exhaust gas at inlet 26. This capability avoids the necessity to use a more powerful, and hence larger and more costly, actuator which would be needed in the absence of pressure balancing.

An alternative construction is shown in FIG. 3 where the direction of flow is reversed so that the former outlet becomes the inlet 80 and the former inlet becomes the outlet 82. Such an alternative design may be advantageous in certain applications by taking advantage of the exhaust pressure to assist in opening the valve. The new inlet comprises a stainless steel insert pipe 84 fitted to the aluminum housing part at the former outlet where the aluminum part is now shaped in FIG. 3 with a ring 86 that is magnetically de-formed onto the inserted end of the stainless steel insert pipe. The angle of the pintle frustum should in any event be chosen in any given design so as to avoid wedging the pintle stuck between the stub pipes when the valve is operated closed.

While a presently preferred embodiment has been illustrated and described, it should be appreciated that the inventive principles may be practiced in other embodiments that are equivalent to the following claims.

What is claimed is:

1. An internal combustion engine comprising exhaust gas recirculation (EGR) apparatus wherein a portion of the engine exhaust gas is recirculated in a controlled manner by an electrically controlled EGR valve to dope a fresh air-fuel charge for the engine with some of the engine's exhaust gas, said EGR valve comprises a housing having an exhaust inlet to which engine exhaust is communicated, an exhaust outlet from which engine exhaust exits the valve to dope a fresh air-fuel charge, a passage extending through said housing between said exhaust inlet and said exhaust outlet, a pintle that is disposed on said housing within said passage and that is selectively linearly positionable within said housing by a linear electric actuator that positions said pintle linearly from closed position to open positions in accordance with a control signal applied to the actuator, said pintle comprising opposite axial ends, a shaft extending from one of said axial ends to said actuator, another of said axial ends of said pintle being in communication with said exhaust inlet via said passage, characterized in that said housing comprises means to communicate said exhaust inlet to said one of said axial ends of said pintle to provide at least some pressure-balancing of said pintle, said housing comprises internal seat means disposed within said passage axially intermediate said opposite axial ends of said pintle for coaction with a portion of said pintle that is axially intermediate said opposite axial ends of said pintle, and said axially intermediate portion of said pintle comprises a frustoconically tapered surface and said internal seat means comprises at least one seating surface that is at a radially inner open distal end of a pipe extending from and through a side wall of said housing that circumferentially bounds a space containing said pintle such that the selective relative positioning of said pintle to said internal seat means selectively restricts the flow of exhaust gas from said exhaust inlet to said exhaust outlet.

2. An internal combustion engine as set forth in claim 1 characterized further in that said frustoconically tapered surface of said axially intermediate portion of said pintle causes said pintle to have a larger diameter portion at said another axial end of said pintle and a smaller diameter portion at said one axial end and said larger portion is closer to said inlet port than is said smaller diameter portion.

3. An internal combustion engine comprising exhaust gas recirculation (EGR) apparatus wherein a portion of the engine exhaust gas is recirculated in a controlled manner by an electrically controlled EGR valve to dope a fresh air-fuel charge for the engine with some of the engine's exhaust gas, said EGR valve comprises a housing having an exhaust inlet to which engine exhaust is communicated, an exhaust outlet from which engine exhaust exits the valve to dope a fresh air-fuel charge, a passage extending through said housing between said exhaust inlet and said exhaust outlet, a pintle that is disposed on said housing within said passage and that is selectively linearly positionable within said housing by a linear electric actuator that positions said pintle linearly from closed position to open positions in accordance with a control signal applied to the actuator, said pintle comprising opposite axial ends, a shaft extending from one of said axial ends to said actuator, another of said axial ends of said pintle being in communication with said exhaust inlet via said passage, characterized in that said housing comprises means to communicate said exhaust inlet to said another of said axial ends of said pintle to provide at least some pressure-balancing of said pintle, said housing comprises internal seat means disposed within said passage axially intermediate said opposite axial ends of said pintle for coaction with a portion of said pintle that is axially intermediate said opposite axial ends of said pintle, and said axially intermediate portion of said pintle and said seat means are constructed and arranged such that the selective relative positioning of said pintle to said internal seat means selectively restricts the flow of exhaust gas from said exhaust inlet to said exhaust outlet, characterized further in that said internal seat means comprises respective seating surfaces at the radially inner open distal ends of respective pipes extending from and through a side wall of said housing that circumferentially bounds a space containing said pintle, said respective pipes being diametrically opposite each other.

4. An internal combustion engine as set forth in claim 3 characterized further in that said respective seating surfaces at the radially inner distal ends of said respective pipes comprise ceramic-coated seats.

5. An internal combustion engine as set forth in claim 4 characterized further in that said pipes are non-perpendicular to the direction of linear positioning of said pintle.

6. An internal combustion engine comprising exhaust gas recirculation (EGR) apparatus wherein a portion of the engine exhaust gas is recirculated in a controlled manner by an EGR valve to dope a fresh air-fuel charge for the engine with some of the engine's exhaust gas, said EGR valve comprises a housing having an exhaust inlet to which engine exhaust is communicated, an exhaust outlet from which engine exhaust exits the valve to dope a fresh air-fuel charge, a passage extending through said housing between said exhaust inlet and said exhaust outlet, a pintle that is disposed on said housing within said passage and that is selectively linearly positionable within said housing by an actuator that positions said pintle from closed position to open positions linearly in accordance with a control input to the actuator, said pintle comprising opposite axial ends, a shaft extending from one of said axial ends to said actuator, another of said axial ends of said pintle being in communication with one of said exhaust inlet and outlet via said passage, characterized in that said housing comprises means to communicate said one of said exhaust inlet and outlet to said one of said axial end, of said pintle at least when said pintle is in closed position to provide at least some pressure-balancing of said pintle, said housing comprises internal seat means disposed within said passage axially intermediate said opposite axial ends of said pintle for coaction with a portion of said pintle that is axially intermediate said opposite axial ends of said pintle, and said internal seat means and said axially intermediate portion of said pintle are constructed and arranged such that the selective relative positioning of said pintle to said internal seat means selectively restricts the flow of exhaust gas from said exhaust inlet to said exhaust outlet.

7. An internal combustion engine comprising exhaust gas recirculation (EGR) apparatus wherein a portion of the engine exhaust gas is recirculated in a controlled manner by an EGR valve to dope a fresh air-fuel charge for the engine with some of the engine's exhaust gas, said EGR valve comprises a housing having an exhaust inlet to which engine exhaust is communicated, an exhaust outlet from which engine exhaust exits the valve to dope a fresh air-fuel charge, a passage extending through said housing between said exhaust inlet and said exhaust outlet, a pintle that is disposed on said housing within said passage and that is selectively linearly positionable within said housing by an actuator that positions said pintle from closed position to open positions linearly in accordance with a control input to the actuator, said pintle comprising opposite axial ends, a shaft extending from one of said axial ends to said actuator, another of said axial ends of said pintle being in communication with one of said exhaust inlet and outlet via said passage, characterized in that said housing comprises means to communicate said one of said exhaust inlet and outlet to said one of said axial ends of said pintle at least when said pintle is in closed position to provide at least some pressure-balancing of said pintle, said housing comprises internal seat means disposed within said passage axially intermediate said opposite axial ends of said pintle for coaction with a portion of said pintle that is axially intermediate said opposite axial ends of said pintle, and said internal seat means and said axially intermediate portion of said pintle are constructed and arranged such that the selective relative positioning of said pintle to said internal seat means selectively restricts the flow of exhaust gas from said exhaust inlet to said exhaust outlet, wherein said internal seat means is an open end portion of a pipe having a central axis at an acute angle to said pintle shaft axis and perpendicular to the surface of said axially intermediate portion of said pintle.

8. An exhaust gas recirculation (EGR) valve for use in an internal combustion engine, wherein a portion of the engine exhaust gas is recirculated in a controlled manner by the EGR valve to dope a fresh air-fuel charge for the engine with some of the engine's exhaust gas, said EGR valve comprises a housing having an exhaust inlet to which engine exhaust is communicated, an exhaust outlet from which engine exhaust exits the valve to dope a fresh air-fuel charge, a passage extending through said housing between said exhaust inlet and said exhaust outlet, a pintle that is disposed on said housing within said passage and that is selectively linearly positionable within said housing by a linear actuator that positions said pintle linearly from closed position to open positions in accordance with a control signal applied to the actuator, said pintle comprising opposite axial ends, a shaft extending from one of said axial ends to said actuator, another of said axial ends of said pintle being in communication with said exhaust inlet via said passage, characterized in that said housing comprises means to communicate said exhaust inlet to said one of said axial ends of said pintle to provide at least some pressure-balancing of said pintle, said housing comprises internal seat means disposed within said passage axially intermediate said opposite axial ends of said pintle for coaction with a portion of said pintle that is axially intermediate said opposite axial ends of said pintle, and said axially intermediate portion of said pintle comprises a frustoconically tapered surface and said internal seat means comprises at least one seating surface that is at a radially inner open distal end of a pipe extending from and through a side wall of said housing that circumferentially bounds a space containing said pintle such that the selective relative positioning of said pintle to said internal seat means selectively restricts the flow of exhaust gas from said exhaust inlet to said exhaust outlet.

9. An exhaust gas recirculation (EGR) valve for use in an internal combustion engine, wherein a portion of the engine exhaust gas is recirculated in a controlled manner by the EGR valve to dope a fresh air-fuel charge for the engine with some of the engine's exhaust gas, said EGR valve comprises a housing having an exhaust inlet to which engine exhaust is communicated, an exhaust outlet from which engine exhaust exits the valve to dope a fresh air-fuel charge, a passage extending through said housing between said exhaust inlet and said exhaust outlet, a pintle that is disposed on said housing within said passage and that is selectively linearly positionable within said housing by a linear actuator that positions said pintle linearly from closed position to open positions in accordance with a control signal applied to the actuator, said pintle comprising opposite axial ends, a shaft extending from one of said axial ends to said actuator, another of said axial ends of said pintle being in communication with said exhaust inlet via said passage, characterized in that said housing comprises means to communicate said exhaust inlet to said one of said axial ends of said pintle to provide at least some pressure-balancing of said pintle, said housing comprises internal seat means disposed within said passage axially intermediate said opposite axial ends of said pintle for coaction with a portion of said pintle that is axially intermediate said opposite axial ends of said pintle, and said axially intermediate portion of said pintle and said seat means are constructed and arranged such that the selective relative positioning of said pintle to said internal seat means selectively restricts the flow of exhaust gas from said exhaust inlet to said exhaust outlet, characterized further in that said internal seat means comprises respective seating surfaces at the radially inner open distal ends of respective pipes extending from and through a side wall of said housing that circumferentially bounds a space containing said pintle, said respective pipes being diametrically opposite each other.

10. An exhaust gas recirculation (EGR) valve for use in an internal combustion engine, wherein a portion of the engine exhaust gas is recirculated in a controlled manner by the EGR valve to dope a fresh air-fuel charge for the engine with some of the engine's exhaust gas, said EGR valve comprises a housing having an exhaust inlet to which engine exhaust is communicated, an exhaust outlet from which engine exhaust exits the valve to dope a fresh air-fuel charge, a passage extending through said housing between said exhaust inlet and said exhaust outlet, a pintle that is disposed on said housing within said passage and that is selectively linearly positionable within said housing by an actuator that positions said pintle from closed position to open positions linearly in accordance with a control input to the actuator, said pintle comprising opposite axial ends, a shaft extending from one of said axial ends to said actuator, another of said axial ends of said pintle being in communication with one of said exhaust inlet and outlet via said passage, characterized in that said housing comprises means to communicate said one of said exhaust inlet and outlet to said one of said axial ends of said pintle at least when said pintle is in closed position to provide at least some pressure-balancing of said pintle, said housing comprises internal seat means disposed within said passage axially intermediate said opposite axial ends of said pintle for coaction with a portion of said pintle that is axially intermediate said opposite axial ends of said pintle, and said internal seat means and said axially intermediate portion of said pintle are constructed and arranged such that the selective relative positioning of said pintle to said internal seat means selectively restricts the flow of exhaust gas from said exhaust inlet to said exhaust outlet.

11. An exhaust gas recirculation (EGR) valve for use in an internal combustion engine, wherein a portion of the engine exhaust gas is recirculated in a controlled manner by the EGR valve to dope a fresh air-fuel charge for the engine with some of the engine's exhaust gas, said EGR valve comprises a housing having an exhaust inlet to which engine exhaust is communicated, an exhaust outlet from which engine exhaust exits the valve to dope a fresh air-fuel charge, a passage extending through said housing between said exhaust inlet and said exhaust outlet, a pintle that is disposed on said housing within said passage and that is selectively linearly positionable within said housing by an actuator that positions said pintle from closed position to open positions linearly in accordance with a control input to the actuator, said pintle comprising opposite axial ends, a shaft extending from one of said axial ends to said actuator, another of said axial ends of said pintle being in communication with one of said exhaust inlet and outlet via said passage, characterized in that said housing comprises means to communicate said one of said exhaust inlet and outlet to said one of said axial ends of said pintle at least when said pintle is in closed position to provide at least some pressure-balancing of said pintle, said housing comprises internal seat means disposed within said passage axially intermediate said opposite axial ends of said pintle for coaction with a portion of said pintle that is axially intermediate said opposite axial ends of said pintle, and said internal seat means and said axially intermediate portion of said pintle are constructed and arranged such that the selective relative positioning of said pintle to said internal seat means selectively restricts the flow of exhaust gas from said exhaust inlet to said exhaust outlet, wherein said internal seat means is an open end portion of a pipe having a central axis at an acute angle to said pintle shaft axis and perpendicular to the surface of said axially intermediate portion of said pintle.

* * * * *